United States Patent [19]
Oldenburg

[11] 3,941,174
[45] Mar. 2, 1976

[54] DEBARKING ASSEMBLY FOR TREE HARVESTERS

[75] Inventor: Dorrance Oldenburg, Peoria, Ill.

[73] Assignee: Caterpillar Tractor Co., Peoria, Ill.

[22] Filed: Feb. 18, 1975

[21] Appl. No.: 550,331

[52] U.S. Cl. ............... 144/208 J; 144/2 Z; 144/3 D
[51] Int. Cl.² ......................................... A01G 23/08
[58] Field of Search ........ 144/2 Z, 3 D, 311, 208 R, 144/208 J, 208 K; 83/928

[56] References Cited
UNITED STATES PATENTS

| | | | |
|---|---|---|---|
| 2,707,007 | 4/1955 | Shuff | 144/2 Z X |
| 3,329,184 | 7/1967 | Longert | 144/2 Z X |
| 3,556,181 | 1/1971 | Jouppi | 144/2 Z |
| 3,565,143 | 2/1971 | Wehr | 144/2 Z X |
| 3,643,708 | 2/1972 | Lindblom | 144/2 Z |

*Primary Examiner*—Frank T. Yost
*Assistant Examiner*—W. D. Bray
*Attorney, Agent, or Firm*—Phillips, Moore, Weissenberger Lempio & Strabala

[57] ABSTRACT

A debarking assembly as part of a tree harvester or tree processing machine also including a drive mechanism for gripping and axially moving trees along a processing path, the debarking assembly including a plurality of generally L-shaped debarking blades having their respective cutting edges resiliently urged into intimate debarking engagement with the tree, the debarking blades preferably being supported by movable mounting means for selectively moving the debarking blades into encircling engagement with the tree.

18 Claims, 5 Drawing Figures

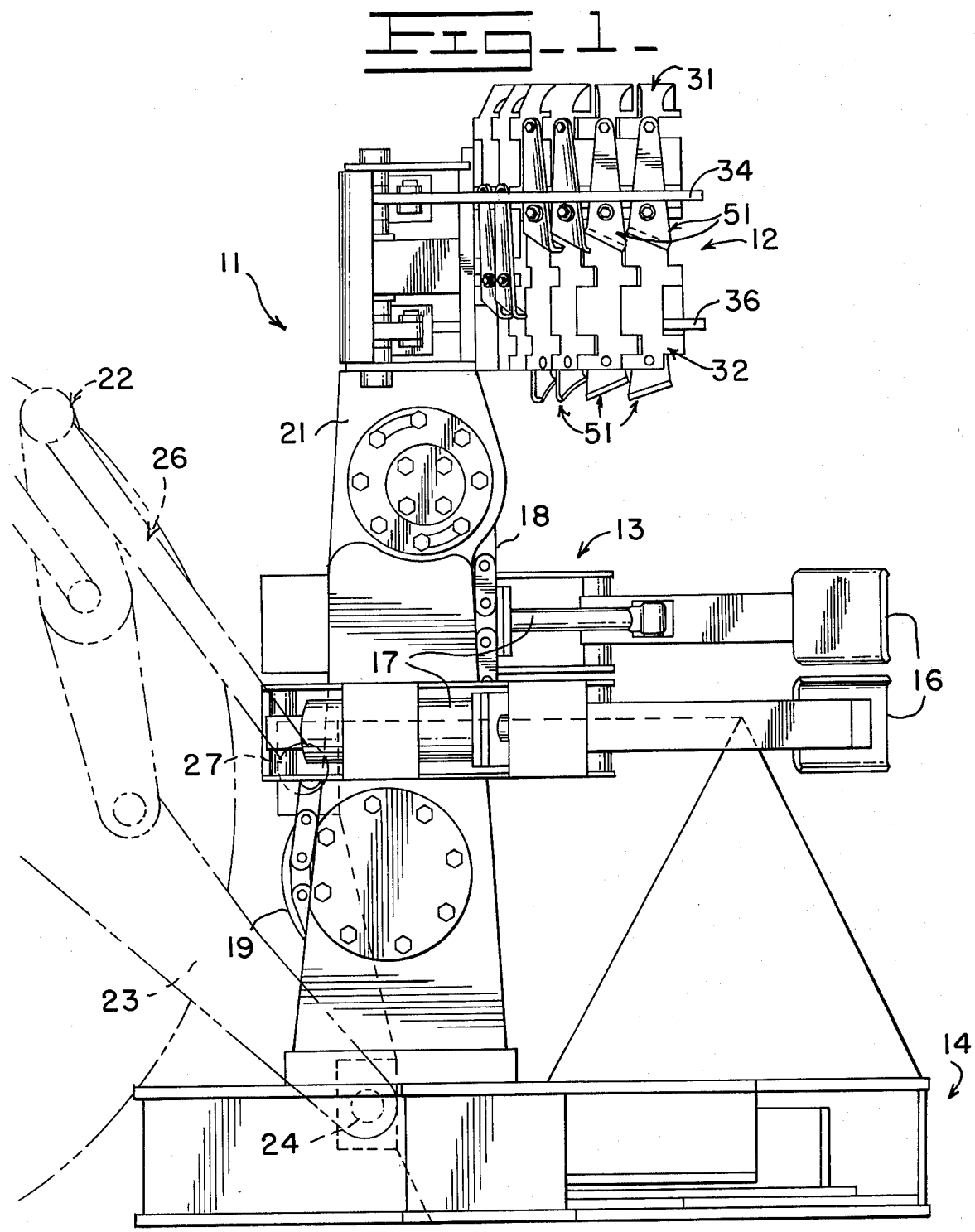

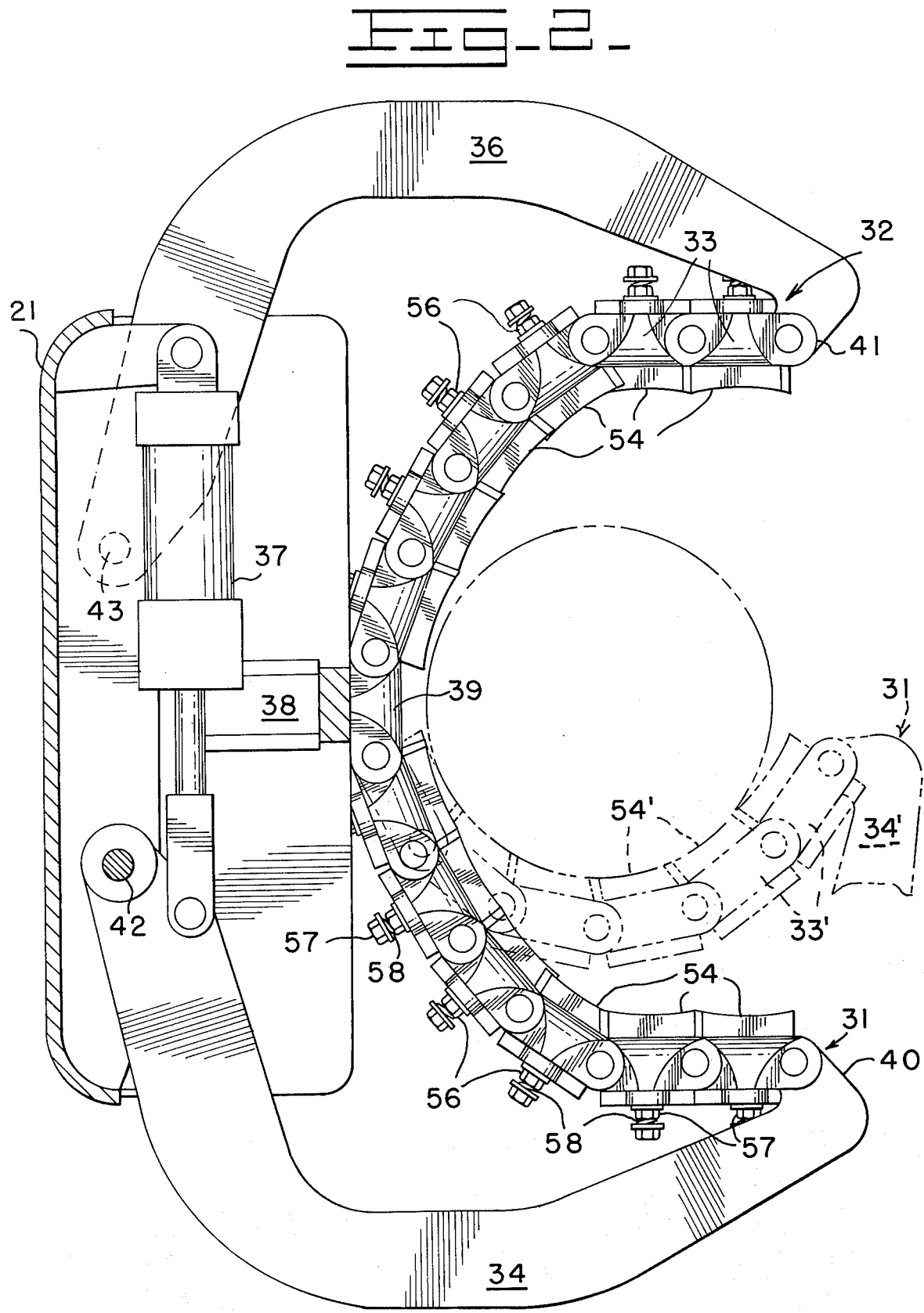

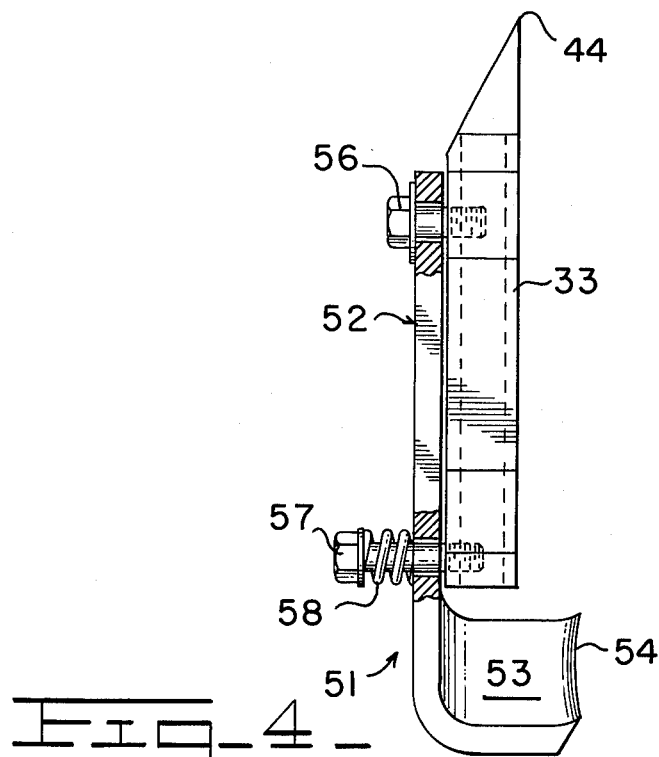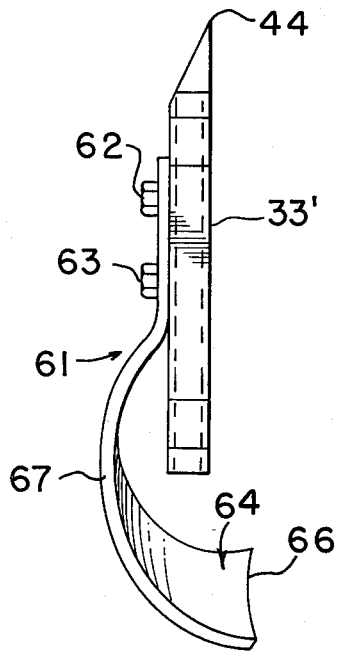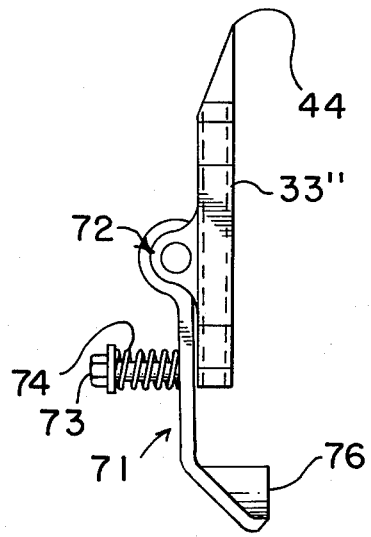

DEBARKING ASSEMBLY FOR TREE HARVESTERS

BACKGROUND OF THE INVENTION

The present invention relates to a debarking assembly as part of a tree harvester or processor. Preferably, the debarking assembly is combined with delimbing means in order to simultaneously delimb and debark the tree during processing. The tree harvester may also include other implements for further processing of the trees. In particular, the tree harvester preferably includes a shear assembly enabling the harvester to cut standing trees and process them into delimbed and debarked sections of selected length.

Portions of the tree harvester disclosed in the accompanying drawings and described in greater detail below, are set forth in greater detail in U.S. Pat. Nos. 3,669,161 and 3,731,720, both of which are assigned to the Assignee of the present invention, the specific construction of the elements set forth in these references not being of critical importance to the present invention.

Mechanical harvesting and processing of trees is a matter of increasing importance in order to meet the needs of the lumber and paper industries, for example, where it has become common to employ machinery for practically every step in the harvesting and processing of trees. Representative steps in the harvesting of trees include the severing of standing trees, delimbing of the trees, debarking, cutting the trees into sections of selected length. Subsequently, the processed tree sections may be collected for delivery to a mill.

It has been found particularly desirable to combine as many of these steps as possible within a single processing machine, for purposes of economy. It is also desirable that the combined steps be performed by a machine of reliable construction to permit extended operation under sometimes severe conditions.

SUMMARY OF THE INVENTION

Accordingly, it is a particular object of the invention to provide an improved debarking assembly for tree harvesting or processing machinery.

It is also an object of the invention to provide a combined debarking and delimbing assembly.

It is a further object of the invention to provide a debarking assembly or combined delimbing and debarking assembly within a tree harvesting machine including drive means for gripping the tree and axially moving it along a processing path.

It is an even further object of the invention to provide such a tree harvesting machine which also includes a shear assembly enabling the machine to completely process standing trees in substantially a single operation.

Additional objects and advantages of the invention are made apparent in the following description having reference to the accompanying drawings.

DESCRIPTION OF THE DRAWINGS

FIG. 1 is a side elevation view of a tree harvesting machine for mounting upon a vehicle, the machine including a combined delimbing and debarking assembly constructed according to the present invention together with a shear assembly and a drive mechanism for gripping and axially moving the trees past the delimbing and debarking assembly.

FIG. 2 is a plan view of the combined delimbing and debarking assembly which also appears in the upper portion of FIG. 1.

FIG. 3 is a side view of a combined element from the delimbing and debarking assembly including a delimbing blade and a debarking blade together with a resilient interconnection.

FIG. 4 illustrates another embodiment of a combined element including a delimbing blade, a debarking blade and a resilient interconnection.

FIG. 5 illustrates yet another embodiment of a combined element including both a delimbing blade and a debarking blade.

DESCRIPTION OF THE PREFERRED EMBODIMENTS

The tree harvesting machine illustrated in the drawings and described below includes a debarking unit combined with a delimbing assembly, the combined delimbing and debarking assembly being arranged upon a vehicular tree harvester which is further adapted to shear standing trees. It will be apparent that the combined delimbing and debarking assembly could be employed in other tree processing apparatus and that the debarking unit could also be employed by itself, for example, to process trees which were previously cut and delimbed.

Referring now to FIG. 1, a vehicular tree harvester is generally indicated at 11 including a combined delimbing and debarking assembly 12, a drive mechanism indicated at 13 for gripping trees to be processed and axially moving them along a processing path through the harvester and a shear assembly indicated at 14. The drive mechanism and the shear assembly are respectively described in greater detail by the two reference patents noted above. For purposes of the present invention, it is sufficient to note that the shear assembly 14 is effective to sever or cut standing trees which are properly arranged within the harvester apparatus.

The drive mechanism 13 generally includes a pair of grapples 16 which may be movedinoppositionto each otherby means of hydraulic motors 17 in order to firmly secure the tree against a drive mechanism 18. The drive mechanism is preferably formed as an endless track or chain assembly arranged for rotation upon the harvester apparatus by means of rollers and sprockets, one of which is partially shown at 19. Such a drive mechanism has been found to be particularly effective, especially for use with the combined delimbing and debarking assembly described below.

The delimbing assembly 12, the drive mechanism 13 and the shear assembly 14 are all supported upon a common frame structure 21 which is movably supported by a vehicle such as that partially shown in phantom at 22. The vehicle is of a type having conventional lift arms, one of which is indicated at 23, with the frame 21 being secured to the lift arms 23 by means of horizontal pivots such as that indicated at 24. A conventional tilt linkage 26 on the vehicle is also pivoted at a point 27 above the pivot point 24 with the tilt linkage being effective to pivot the frame 21 about the pivot point 24.

In operation, the tree harvester apparatus is positioned by the vehicle to receive a standing tree within the shear assembly, the grapple 16 and the delimbing assembly 12. The grapples 16 are engaged with the tree by means of the motor 17 so that the tree is urged against the drive track 18, the delimbing and debarking assembly also being engaged with the tree in a manner described in greater detail below. The tree is then severed by the shear assembly after which the top of the tree harvester is rotated forwardly and downwardly by the tilt linkage 26 so that the tree is in a generally horizontal position. The tree may then be moved axially through the delimbing assembly and toward the shear assembly by the track 18 in order to remove limbs from the tree. During this mode of operation, the shear assembly 14 may be intermittently operated, if desired, to also cut the delimbed tree into appropriate lengths.

Construction features of the combined delimbing and debarking assembly 12 are better illustrated in FIG. 2 while various embodiments of combined delimbing and debarking blade components are illustrated in FIGS. 3–5. Major components for the combined delimbing and debarking assembly include a portion of the frame 21 and two elongated flexible structures or chains 31 and 32, each including a plurality of pivoted elements or links 33. Motor means for positioning the two flexible elements include a pair of arms or levers 34, 36 and hydraulic jacks 37 interconnected respectively between the frame and each of the levers.

As may be best seen in FIG. 2, one end of each flexible element or a central portion of the combined flexible assembly 31, 32 is secured to a central portion 38 of the frame 21 by means of a central member 39. The elements 33 are connected to the central member in offset relation (see FIG. 1) to permit complete encirclement of the tree by the two flexible chains 31 and 32. The free ends 40 and 41 of the two flexible blades are secured respectively to the levers 34 and 36. The upper end of each of the blade elements 33 and the central member 39 forms a cutting edge indicated at 44. The delimbing cutting edges 44 are thus arranged in opposition to the direction in which the tree is moved through the harvester by the drive mechanism 18.

Referring now particularly to FIGS. 2 and 3, a debarking blade 51 is associated with each of the delimbing blade elements 33. The debarking blade 51 is generally L-shaped and includes a shank portion 52 which is resiliently connected with the delimbing element 33. A portion of the debarking blade indicated at 53 extends perpendicularly toward the tree (see FIGS. 1 and 2) and includes a cutting edge indicated at 54.

A resilient coupling between the debarking blade 51 and the delimbing element 33 includes a pair of screws 56 and 57 which penetrate the shank portion 52 and thread into the delimber element 33. The perpendicularly extending portion 53 of the debarking blade 51 is urged in a rightward direction, as viewed in FIG. 3, by means of a coil spring 58 which interacts between the debarking blade shank 52 and the screw 57.

In operation of the combined delimbing and debarking assembly, the free ends 40 and 41 of the flexible chains 31 and 32 are moved outwardly by means of the jacks 37 to the position illustrated in solid lines in FIG. 2. With the delimbing and debarking assembly in this position, a tree may be properly positioned within the harvester apparatus, the jacks 37 then being retracted to move the free ends of the flexible elements into overlapping position where they encircle the tree. The overlapping position for one of the flexible chains 31 and the associated lever 34 is illustrated in phantom in FIG. 2. It is apparent that for any size tree, the two flexible elements may be brought into varying degrees of overlap depending upon the size of the tree so that a substantial delimbing and debarking cutting edge may be formed around the entire circumference of the tree. The jacks 37 may be operated to apply constant force to the levers 34 and 36 and thus assure continual engagement for both the delimbing and debarking blades with the tree.

As the flexible chains 31 and 32 are urged into engagement with the circumference of the tree, the debarking blades 51 (see FIG. 3) tend to move outwardly against their respective springs 58 which thus serve to insure intimate debarking engagement for the cutting edge 54 with the tree.

It may also be seen in FIGS. 1 and 3 that the cutting edge 54 for the respective debarking blades 51 are angled or offset relative to the circumference of the tree. This enables bark and other debris removed from the tree by the debarking blades to freely pass through the debarking assembly.

Another embodiment of the debarking blade is indicated at 61 in FIG. 4 for use in similar combination with the delimbing blade element indicated at 33'. The debarking blade 61 is rigidly secured at one end to the delimbing blade element 33' by means of screws 62 and 63. The debarking blade 61 similarly has a perpendicularly extending portion 64 forming a cutting edge 66 for debarking engagement with the tree. The debarking blade 61 is preferably formed from spring steel and includes a bowed intermediate section 67 which serves to urge its cutting edge rightwardly as viewed in FIG. 4.

Yet another embodiment of a debarking blade is indicated in FIG. 5 at 71 in combination with a similar delimbing blade element 33''. The upper end of the debarking blade 71 is connected to the blade element 33'' by means of a pivot assembly 72. A screw 73 penetrates an intermediate portion of the blade 71 and threads into the delimbing blade element 33''. An interacting coil spring 74 similarly urges a cutting edge 76 rightwardly for similar debarking engagement with a tree.

It may also be seen that the cutting edges 66 and 76 respectively for the debarking blades 61 and 71 are similarly angled or offset for the same reason discussed above with respect to FIG. 3.

I claim:

1. In a tree harvester assembly for mounting on a vehicle, the tree harvester assembly including an elongated frame, drive means arranged upon the frame for gripping and axially moving a tree along a processing path and delimbing means arranged for engagement with the tree as it is moved along its processing path by the drive means, the delimbing means including a plurality of delimbing blades and mounting means for selectively moving the delimbing blades into engagement with substantially the entire circumference of the tree, the delimbing blades being arranged for facing engagement with the tree as it is moved along its processing path, the improvement comprising a debarking blade means associated with each of the delimbing blades and arranged for engagement with the tree subsequent to engagement of the tree with the respective delimbing blade, and means for resiliently mounting each debarking blade relative to the respective delimbing blade, each debarking blade being arranged in generally perpendicular relation to the tree axis with the resilient mounting tending to maintain intimate debarking engagement between the respective debarking blades and the tree.

2. The tree harvester assembly of claim 1 wherein the resilient mounting includes releasable means facilitating replacement of the debarking blades.

3. The tree harvester assembly of claim 1 wherein each debarking blade is generally L-shaped and has an elongated shank movably secured to the respective delimbing blade by means of the resilient mounting.

4. The tree harvester of claim 3 wherein the resilient mounting includes spring means for urging each debarking blade into intimate debarking engagement with the tree.

5. The tree harvester of claim 3 wherein the plurality of debarking blades are supported in offset alignment relative to the tree circumference in order to facilitate the escape of bark and other material removed from the tree by the debarking blades.

6. The tree harvester assembly of claim 5 wherein the resilient mounting includes releasable means facilitating rapid replacement of the debarking blades.

7. The tree harvester assembly of claim 1 wherein each debarking blade is rigidly secured relative to the respective delimbing blade, the debarking blade being formed of spring steel and having an extended resilient portion for urging its cutting edge into intimate debarking engagement with the tree.

8. The tree harvester assembly of claim 7 wherein the resilient mounting includes releasable means facilitating rapid replacement of the debarking blades.

9. The tree harvester assembly of claim 1 wherein each debarking blade includes a shank which is pivotably mounted relative to the respective delimbing blade, pivotable movement of the debarking blade tending to move its cutting edge into and out of engagement with the tree.

10. The tree harvester assembly of claim 9 wherein the resilient mounting includes spring means for urging each debarking blade into intimate debarking engagement with the tree.

11. The tree harvester assembly of claim 10 wherein the plurality of debarking blades are arranged in offset alignment relative to the tree circumference in order to facilitate the escape of bark and other material removed from the tree by the debarking blades.

12. The tree harvester assembly of claim 1 wherein the plurality of debarking blades are arranged in offset alignment relative to the tree circumference in order to facilitate the escape of bark and other material removed from the tree by the debarking blades.

13. The tree harvester assembly of claim 12 wherein the resilient mounting includes spring means for urging each debarking blade into intimate debarking engagement with the tree.

14. A tree processing assembly including an elongated frame, drive means supported upon the frame for gripping and axially moving a tree along a processing path and debarking means arranged for engagement with the tree held by the drive means, the debarking means comprising a plurality of debarking blades each having a shank portion arranged generally parallel with the processing path for the tree and a perpendicularly extending blade portion including a cutting edge for debarking engagement with the tree, mounting means for respectively supporting the plurality of debarking blades, each debarking blade and the respective mounting portion including resilient means tending to maintain intimate debarking engagement between its cutting edge and the tree, and motor means operatively connected between the frame and at least a portion of the mounting means for selectively moving the debarking blades into surrounding engagement with the circumference of the tree.

15. The tree processing assembly of claim 14 wherein the mounting means includes releasable means facilitating rapid replacement of the debarking blades.

16. The tree processing assembly of claim 14 wherein the plurality of debarking blades are arranged in offset alignment relative to the tree circumference in order to facilitate the escape of bark and other material removed from the tree by the debarking blades.

17. The tree processing assembly of claim 14 wherein each debarking blade includes an extended portion formed of spring steel for resiliently urging its cutting edge into intimate debarking engagement with the tree.

18. A tree harvester for processing standing trees, comprising a vehicle, a frame movably mounted on the vehicle, means for severing a standing tree, drive means for gripping and axially moving the severed tree along a processing path, delimbing means comprising a plurality of delimbing blades arranged for engagement with the tree in facing relation to the direction of travel for the tree along the processing path, debarking means comprising a plurality of debarking blades arranged for engagement with the tree subsequent to movement of the tree past the delimbing blades, and mounting means for supporting the delimbing blades and debarking blades relative to the frame and for selectively moving both sets of blades into closing engagement about substantially the entire circumference of the tree, the mounting means comprising a resilient coupling for supporting each debarking blade and urging it into engagement with the tree being processed to maintain intimate debarking engagement therebetween.

* * * * *